United States Patent [19]

Andersen

[11] Patent Number: 4,589,334

[45] Date of Patent: May 20, 1986

[54] APPARATUS FOR TREATING CELLULOSE-CONTAINING MATTER, E.G. STRAW, WITH GASEOUS AMMONIA

[75] Inventor: Arne L. Andersen, Naestved, Denmark

[73] Assignee: Flemstofte-Mads Amby Maskinfabriker A/S, Fuglebjerg, Denmark

[21] Appl. No.: 512,691

[22] Filed: Jul. 11, 1983

[30] Foreign Application Priority Data

Jul. 16, 1982 [GB] United Kingdom ................ 8220743

[51] Int. Cl.$^4$ ............................................. A23K 1/00
[52] U.S. Cl. .................................... 99/534; 99/476; 99/516
[58] Field of Search ................. 99/483, 467, 473–476, 99/516, 534, 536; 426/69, 281, 335, 626, 636

[56] References Cited

U.S. PATENT DOCUMENTS

4,401,019 8/1983 Leonov et al. .................... 99/516 X

FOREIGN PATENT DOCUMENTS

145051  8/1982 Denmark .
336014 10/1930 United Kingdom .
1499624 2/1978 United Kingdom .
1520577 8/1978 United Kingdom .
2122864 1/1984 United Kingdom .................. 99/534
682219  8/1979 U.S.S.R. .

OTHER PUBLICATIONS

"New Techniques for the Improvement of Poor Quality Forages" Wylce A. R., AGR. North Ireland, 1981.

Primary Examiner—Timothy T. Simone
Attorney, Agent, or Firm—Fleit, Jacobson, Cohn & Price

[57] ABSTRACT

In a method for treating straw placed in a processing chamber (6) with gaseous ammonia, the gaseous ammonia is supplied in aqueous solution (2) and liberated by heating with a heater (5) to circulate within the straw in the processing chamber. By supplying the ammonia in solution, it is possible to use an ammonia source in the form of solutions readily available on most markets, even in less technically developed countries.

When the surplus ammonia is removed from the straw (FIG. 3), it is washed out of the air/gas mixture leaving the processing chamber by the use of a scrubber (8) so that no or substantially no ammonia is discharged to atmosphere. The liquid from the scrubber (8) is kept in reservoirs (14,15) for use in treating the next batch of straw, or drained off to liquid manure as shown.

6 Claims, 6 Drawing Figures

APPARATUS FOR TREATING CELLULOSE-CONTAINING MATTER, E.G. STRAW, WITH GASEOUS AMMONIA

The present invention relates to a method and an apparatus for treating cellulose-containing matter, such as straw, with gaseous ammonia. Such treatment is known to cause a considerable increase in the animal feed value of the material treated, and apparatus for carrying out known methods is known, e.g. from the published Danish Patent Specification No. (DK application No. 2648/77).

When carrying out the known methods, the ammonia is supplied in the form of pure liquefied ammonia, which in most of the industrialized countries can be delivered to farms etc., where the requisite apparatus will be situated. Prior to the treatment the liquefied ammonia is, of course, evaporated to form gaseous ammonia in a manner known per se.

In many countries with a lower degree of industrial development, liquefied ammonia is, however, not commonly available, or its cost is prohibitive for use in the process referred to above. It is, therefore, a first object of the present invention to provide a method of the kind referred to above, which can be carried out by using sources of ammonia that are more easily available and/or less costly than the liquefied ammonia previously used for this purpose.

In a first aspect of the method according to the invention, the above-mentioned first object is attained by producing the gaseous ammonia on the site of processing by liberating gaseous ammonia from an ammonium-containing compound, such as ammonium hydroxide in aqueous solution or an ammonium salt in the dry state or in aqueous solution, e.g. by heating. By proceeding in this manner, it is possible to use sources of ammonia that are far more easily and cheaply available, even in the so-called developing countries, than liquefied ammonia, and easier to handle.

Another problem encountered when carrying out treatment of the kind referred to above is the pollution of the environment often caused by greater or smaller quantities of gaseous ammonia escaping into the atmosphere during a stage in the treatment process, when surplus ammonia is removed from the material after the treatment proper. It is, therefore, a second object of the present invention to provide a method of the kind referred to above, which can be carried out without there being any risk of ammonia escaping to the atmosphere in any but insignificant quantities.

In a second aspect of the method according to the invention, the above-mentioned second object is attained by recovering any gaseous ammonia still present in the gas or gas and vapour leaving the said cellulose-containing matter after having passed through it by bringing it into contact with a substance capable of reversibly absorbing gaseous ammonia, such as water or an aqueous solution of an acid capable of combining reversibly with ammonia to form an ammonium salt, preferably one which is soluble in water. By proceeding in this manner, it is possible to remove all or practically all gaseous ammonia from the gas mixture leaving the processing zone during the removal of surplus ammonia, so that no gaseous ammonia or only an insignificant quantity escapes to the atmosphere. Further, the use of a reversible process makes is possible to use the substance having absorbed the surplus ammonia for producing ammonia for use in the treatment process, as stated above with reference to the first aspect of the invention.

In a third aspect of the method according to the invention, the above-mentioned first and second aspects are combined so that the gaseous ammonia is produced as stated with reference to the first aspect and any surplus recovered as stated with reference to the second aspect, thus causing a re-cycling of any ammonia not absorbed by the said cellulose-containing matter. This third aspect also includes that ammonia used by such absorption by the said cellulose-containing matter or lost, e.g. by leakage, is replaced by adding suitable amounts of the ammonia-containing compound to the process stage in which the said liberation takes place.

The apparatus for carrying out the method according to the invention is of the type, known per se, comprising a processing chamber for receiving material to be processed by passing gaseous ammonia therethrough, and is, according to the invention and with a view to carrying out the method in its first aspect as mentioned above, characterized by a space for containing a substance capable of giving off gaseous ammonia when heated, and heating means for supplying heat to said substance.

For carrying out the method in its second aspect, the apparatus according to the invention is characterized by blower means for transporting gaseous media from said processing chamber and exhausting same, e.g. to atmosphere, and gas/liquid contact means for bringing said gaseous media being transported from the processing chamber into intimate contact with a substance capable of absorbing gaseous ammonia, before exhausting said gaseous media, e.g. to atmosphere.

For carrying out the method in its third aspect, which—as mentioned above—represents a combination of the first and the second aspects with further method steps, the apparatus according to the invention is characterized by a processing chamber for receiving material to be processed by passing gaseous ammonia therethrough, a space for containing a substance capable of giving off gaseous ammonia when heated, heating means for supplying heat to said substance, blower means for transporting gaseous media from said processing chamber and exhausting same, e.g. to atmosphere, gas/liquid contact means for bringing said gaseous media being transported from the processing chamber into intimate contact with a substance capable of absorbing gaseous ammonia, before exhausting said gaseous media, e.g. to atmosphere, and such an arrangement that said heating means are inactive during such periods, when said blower means are active in transporting said gaseous media from said processing chamber and exhausting same, e.g. to atmosphere.

In a first practical embodiment, the apparatus according to the invention is characterized by such an arrangement that said substance is placed directly below said processing chamber in direct communication therewith and adapted to be heated by direct contact with said heating means, the latter being situated in the lower part of a processing tank, of which the processing chamber constitutes an upper part, and in that said gas/liquid contact apparatus comprises a scrubber being disposed in the gas path from said processing chamber to exhaust, said scrubber being adapted to receive scrubbing liquid, either from said substance in the form of a liquid or from an external supply of liquid.

In a second practical embodiment, the apparatus according to the invention is characterized by such an arrangement that said substance is placed in a space separate from said processing chamber, from which space the substance in the form of a liquid can be pumped to form a series of jets or a liquid spray intercepting gaseous media being transported from said processing chamber, either in a first operating mode, in which said gaseous media are circulated in a closed circuit and heated by said heating means, or in a second operating mode, in which the gaseous media when leaving said jets or spray are exhausted, e.g. to atmosphere.

In both the practical embodiments mentioned above, the apparatus according to the invention may comprise operation control valve means adapted to switch the apparatus from one operating mode to another.

In the following, the invention is explained by detailed reference to two non-limiting examples of practical embodiments of the apparatus according to invention, these two embodiments being shown diagrammatically in the accompanying drawings, of which

It should be noted that the relative sizes of the various components as shown in the drawings bear no relation to the relative sizes of the corresponding real components contemplated for use in practising the invention, as some components are drawn relatively large for the sake of clarity and ease of understanding.

Figure 1:
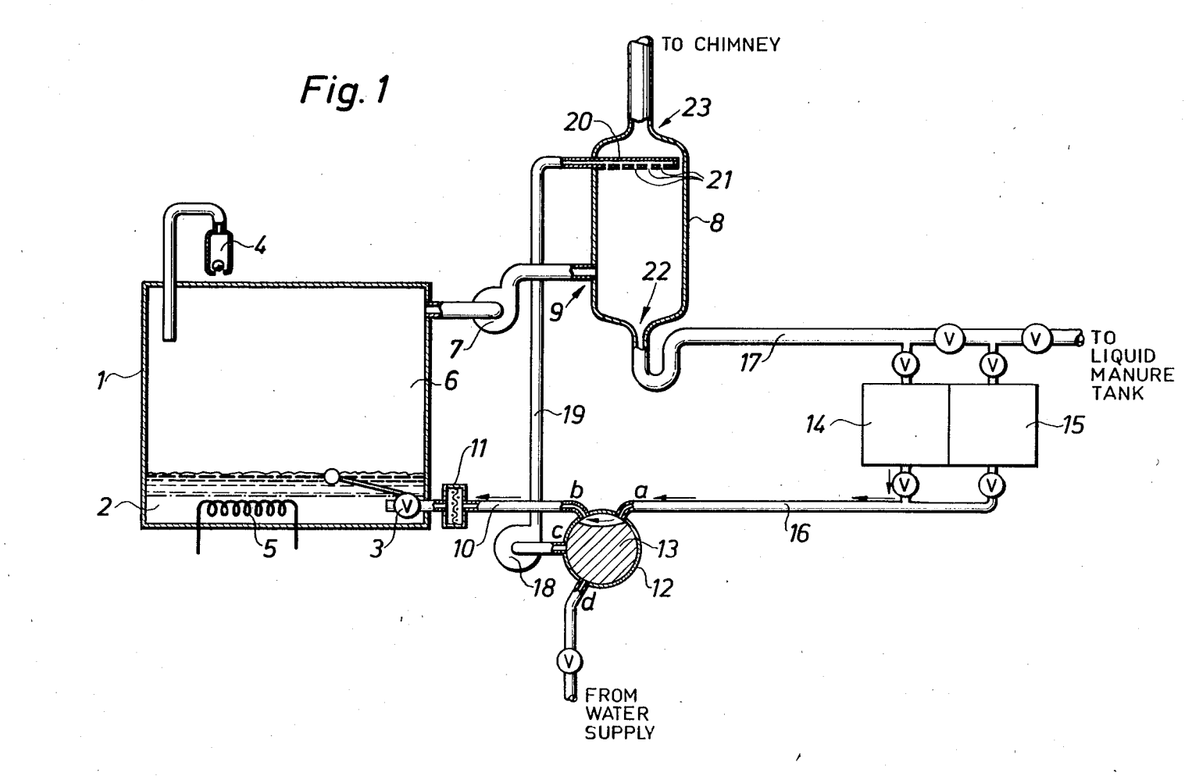
FIGS. 1-4 show the first embodiment in four different operating modes.

FIG. 1 shows a processing tank 1, which may be of the type disclosed in Danish patent application No. 2648/77, suitably modified, but other types may also be used. In its bottom part the processing tank 1 contains a mass of water 2, in which a varying amount of ammonia may be dissolved, depending on circumstances, as will be evident from the following. The level of the water 2 is kept within predetermined limits by means of a level control valve 3, and air can enter the processing tank 1 through an air inlet valve 4, which is constructed as a non-return valve, so that air, gases and/or vapours cannot escape from the tank 1 through the valve 4.

The bottom part of the processing tank 1 further contains a heating coil 5, which may be any type of heating element suitable for the purpose of heating the water 2 in the bottom part of the processing tank 1. Thus, the heating coil 5 may be an electric heating element or a suitably convoluted or helically wound tube, through which a suitable heating medium may be passed. The heating coil 5 may be controlled by known means, such as a thermostat (not shown), for the purpose of controlling the temperature of the water 2 in a suitable manner.

Finally, the processing tank 1 contains a processing chamber 6, in which cellulose-containing material, such as straw, may be placed for the purpose of processing with gaseous ammonia, this process being known to cause a considerable increase in the animal feed value of straw.

Externally, the processing tank 1 is connected to the suction side of a blower 7, the pressure side of which is connected to a gas/liquid contact apparatus in the form of a so-called scrubber 8, in such a manner that air or a mixture of air and gas will be transported by the blower 7 from the upper part of the processing chamber 6 (or at least from a point therein where substantially no liquid is likely to be encountered) to the gas entry 9 of the scrubber 8.

Another external connection is a water pipe 10 with a filter or sieve 11, which communicates with the water 2 in the lower part of the processing tank 1 through the level control valve 3. The opposite end of the water pipe 10 is connected to one port designated "b" in a four-way operation control valve 12, the other three ports, designated "a", "c" and "d", being connected to various items of equipment, as will be explained below. In the remainder of the present detailed specification, these ports will be designated 12a–12d. The operation control valve 12 contains a valve switching rotor 13, which in its various positions, to be described below, connects one of the ports 12a–12d to an adjacent port, or leaves all ports unconnected, i.e. blocked or closed.

The port 12c of the operation control valve 12 is connected to the suction side of a liquid pump 18, the pressure side of which is connected to a scrubbing liquid pipe 19 ending in a scrubbing liquid spreader 20 with nozzles or jet openings 21 placed inside the upper part of the scrubber 8. Scrubbing liquid ejected from the nozzles 21 will—after having passed through the gas-/liquid contact zone of the scrubber—fall or run down into a scrubbing liquid exit 22, from where the liquid may flow through an upper concentrate pipe 17 through suitable valves to a first concentrate tank 14, a second concentrate tank 15, or to a liquid manure tank (not shown) as indicated on the drawing. From the first and second concentrate tanks 14 and 15 respectively the liquid may flow—again through suitable valves—through a lower concentrate pipe 16 to port 12a on the operation control valve 12.

The gas exit 23 of the scrubber 8 may be connected to a suitable exhaust arrangement (not shown), such as a chimney as indicated on the drawing. The port 12d on the operation control valve 12 is connected to a suitable water supply (not shown), as indicated on the drawing.

FIG. 1 shows a stage in the operating cycle, in which water containing ammonia and/or ammonium hydroxide in solution is transferred from the first concentrate tank 14, through the lower concentrate pipe 16, through the valve 12 with its rotor 13 connecting ports 12a to 12b, through the water pipe 10 and its filter or sieve 11, and through the level control valve 3 to the space for the liquid 2 in the lower part of the processing tank 1. At this stage, the cellulose-containing material to be treated, such as straw (not shown), is placed or has been placed in the processing chamber 6 in preparation for the processing to be carried out in the next stage. The level control valve 3 shuts off the supply, when the surface of the liquid 2 has reached the level shown in full line in FIG. 1.

Figure 2:
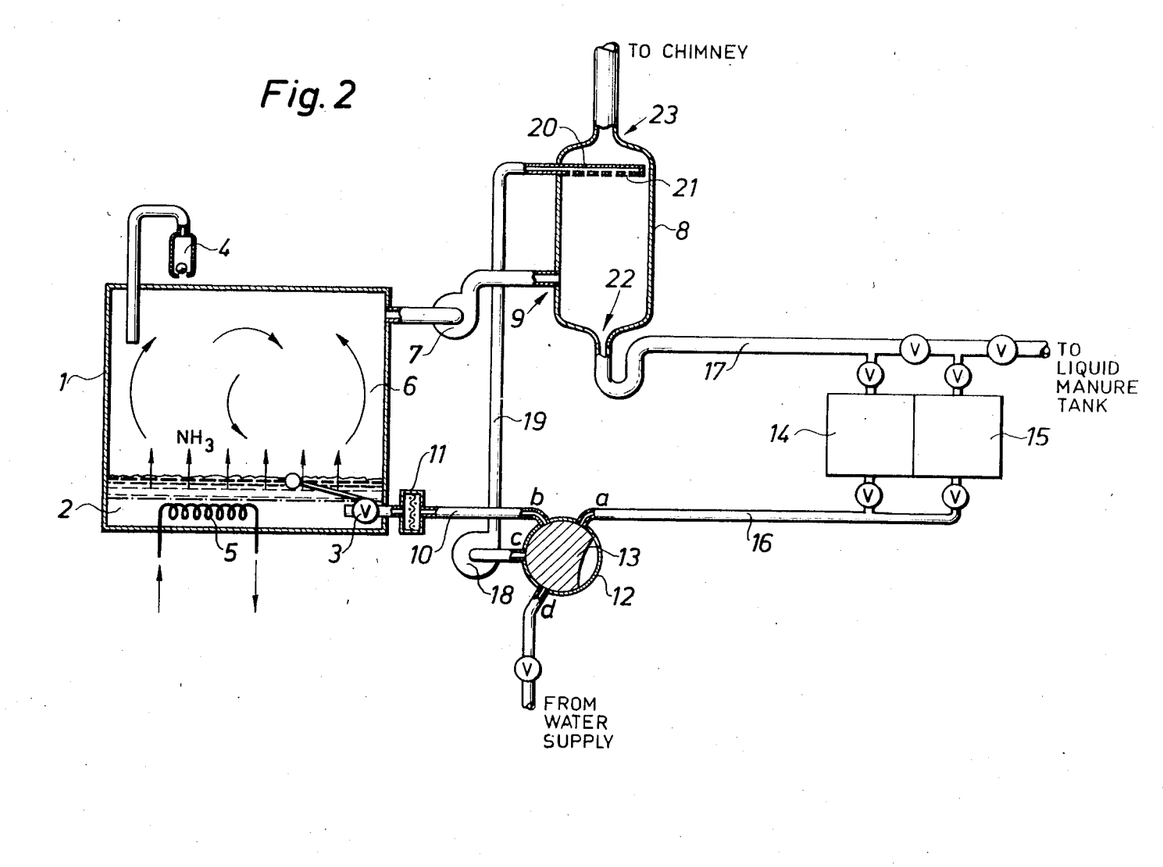

FIG. 2 shows the next stage in the operating cycle, in which stage the switching rotor 13 in the operating control valve 12 is placed in a position, in which all ports 12a–12d are closed or blocked as shown. All the activity takes place in the processing tank 1, in that the heating coil 5 is supplied with electric power or heated medium as indicated by the arrows, thus heating the liquid 2 in the bottom part of the processing tank 1. By this heating the temperature of the liquid 2 is raised to a point, where gaseous ammonia ($NH_3$) is liberated in quantity, filling the spaces in the cellulose-containing material (not shown) placed in the processing chamber 6, and circulating (by means not shown) through this material as indicated by the arrows in the chamber 6. This treatment is continued for a sufficiently long period to cause the desired improvement in the feed value of the cellulose-containing material, such as straw, being treated. If necessary, the operation control valve 12 may temporarily be set to the position shown in FIG. 1 in order to enable additional ammonia-containing liquid to be transferred from the first concentrate tank 14 or—if desired—from the second concentrate tank 15. When the treatment is finished, the supply of power or heated medium to the heating coil 5 is shut off, and the equipment switched to the operating state illustrated in FIG. 3.

Figure 3:
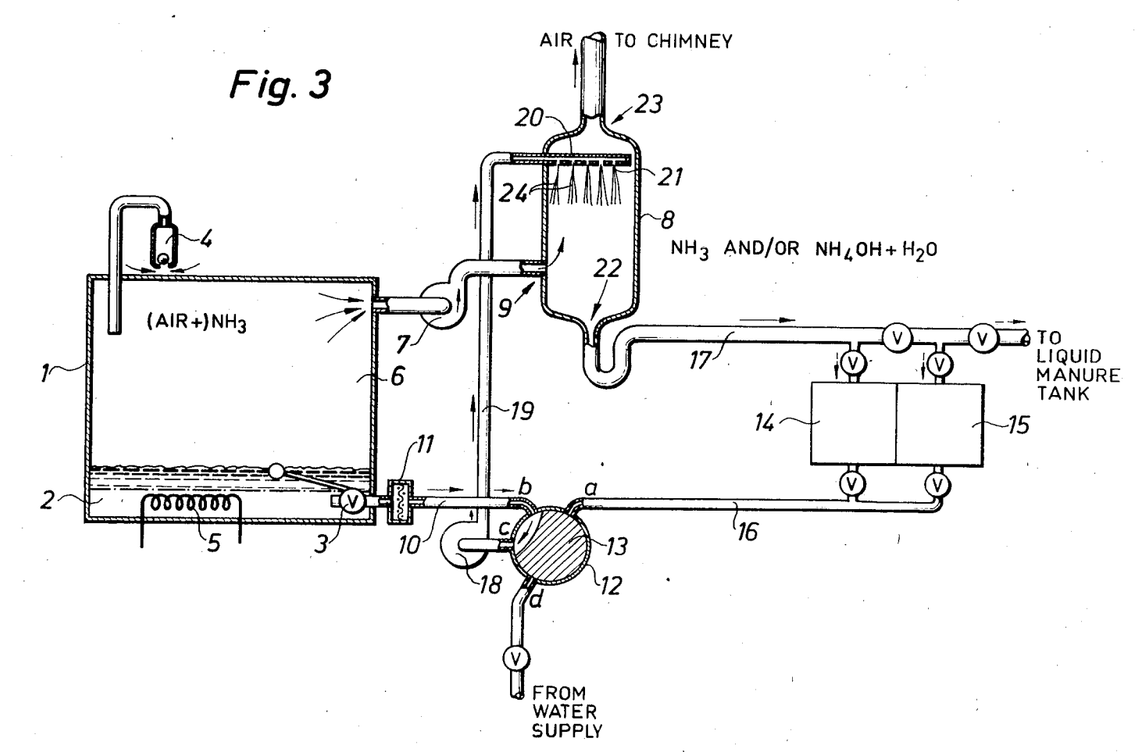

FIG. 3 shows the operation control valve 12 with its switching rotor 13 in a third position, in which it provides communication between the ports 12b and 12c as shown. Further, both the blower 7 and the liquid pump 18 are now running, being driven by suitable motors (not shown). The operation of the blower 7 causes ammonia, which has not been absorbed by the processed material, to be exhausted from the processing chamber 6 as indicated by the arrows. In most cases the ammonia will be accompanied by air and/or steam, the sub-atmospheric pressure developed by the blower 7 causing air to be sucked in through the non-return air inlet valve 4. The resulting mixture of ammonia with air and/or steam will thus be transported to the scrubber 8, entering same through its gas entry 9 as indicated by the arrows.

At the same time, the operation of the liquid pump 18 causes liquid to be pumped from the bottom part of the processing tank 1, by way of the pipe 10, valve ports 12b and 12c, and the scrubbing liquid pipe 19 to the scrubbing liquid spreader 20, issuing from its nozzles or openings 21 in the form of liquid spray or jets 24 as indicated on FIG. 3. In the scrubber 8, which may be of any suitable known or new construction and designed according to well-known principles, the mixture of ammonia with air and/or steam transferred from the processing chamber 6 is washed or "scrubbed" by the liquid jets 24, with the result that most or all of the ammonia present in said mixture is dissolved in the liquid and transported in solution in the liquid out through the scrubbing liquid exit 22 to the upper concentrate pipe 17, and from that pipe 17 to either of the first and second concentrate tanks 14 and 15 respectively or to the liquid manure tank (not shown), the latter alternative being of interest when the concentration of ammonia in the gas mixture transferred from the processing chamber 6 has fallen below some threshold value, below which its usefulness for supplying ammonia to the processing chamber 6 as described with reference to FIG. 1 is limited. To make the process of dissolving the ammonia in the liquid from the bottom part of the processing tank 1 more efficient, the liquid may be cooled by means not shown before being supplied to the scrubber 8. The washed or "scrubbed" air with a very small content of gaseous ammonia, or none at all, leaves the scrubber 8 through the gas exit 23, issuing direct to atmosphere or to a chimney (not shown) as indicated.

The decision with regard to which of the two concentrate tanks 14 and 15 the liquid effluent from the scrubber 8 is to be transferred to, or whether the effluent should be transferred to the liquid manure tank (not shown), may be based on measurements of the concentration of ammonia or ammonium hydroxide in the effluent. Such measurements may be carried out by means of known instruments placed in, e.g., the upper concentrate pipe 17, such as an instrument measuring specific gravity of liquids (areometer), and one possible procedure would be to transfer the first effluent having a relatively high concentration to the first concentrate tank 14, then the next portion of the effluent with a somewhat lower concentration to the second concentrate tank 15, and finally discharging the last effluent having a relatively low concentration—too low for efficient use in supplying ammonia by being heated in the bottom part of the processing tank as shown in FIG. 2—to the liquid manure tank (not shown). This procedure may be carried out, either by setting the valves associated with the upper concentrate pipe 17 and the concentrate tanks 14 and 15 manually after observing the reading on the said aremoeter (not shown), or means (not shown) may be provided for effecting the requisite control functions automatically, based on the same or similar criteria with regard to the concentration of ammonia or ammonium hydroxide in the effluent passing through the upper concentrate pipe 17. The amount of liquid to be transferred from the concentrate tank in question to the bottom part of the processing tank 1, in an operation similar to the one illustrated in FIG. 1, can then be decided on the basis of the concentration of ammonia and/or ammonium hydroxide in the liquid in the concentrate tank.

As some of the ammonia liberated in the operation illustrated in FIG. 1 and described with reference thereto will be absorbed and/or chemically or otherwise bound to the cellulose-containing material (not shown) present in the processing chamber 6 during the process operating stage illustrated in FIG. 3, and some lesser quantities possibly lost by leakage to the exterior, it will from time to time be necessary to replenish the ammonia content of the system. This may be done, either by introducing pure liquid ammonia at some suitable point in the system by the use of means not shown, or alternatively by introducing an aqueous solution of ammonia and/or ammonium hydroxide (corresponding to "household ammonia" or "spirits of ammonia"), also at some suitable point in the system, such as directly into the mass of liquid 2 in the bottom part of the processing tank 1. This use of an aqueous solution is especially advantageous in locations where liquefied pure ammonia is not easily obtainable, due to the complicated technology required for its manufacture, storage, transportation and delivery.

Figure 4:
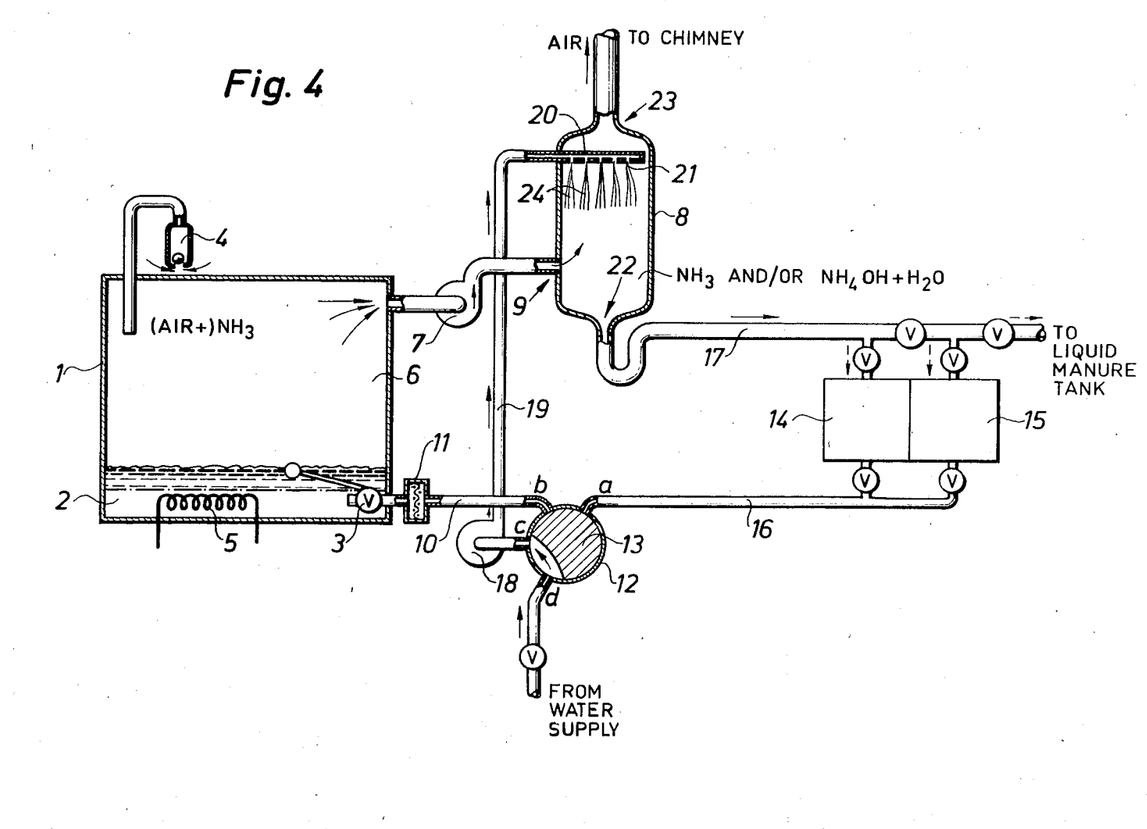

Should it take too long a time to cool the liquid 2 in the bottom part of the processing tank 1 before it can be used for carrying out the scrubbing operation, i.e. the washing-out of the surplus ammonia in the processing chamber 6, illustrated in FIG. 3, it is possible to set the system for operation as shown in FIG. 4. In the operating mode shown in FIG. 4, the switching rotor 13 in the operation control valve 12 is set to provide communication between the valve ports 12c and 12d, thus makinq it possible to use water from the water supply—such as a municipal waterworks supplying water at a fairly low temperature, e.g. between 7 and 9 degrees Centigrade (depending, of course, on the ground temperature in the region concerned)—which does not have to be cooled before being used for this purpose. The system may then be set to the mode shown in FIG. 3 as soon as the water in or from the bottom part of the processing tank 1 has had time to cool sufficiently, as otherwise there would be a risk of increasing the total water content of the system to an extent not consistent with the dimensions of the various tanks and pipes. Such excess water may, of course, be discharged to the liquid manure tank (not shown) through the upper concentrate pipe 17.

When the processing as illustrated in FIG. 2, and the removal and recovery of surplus ammonia as illustrated in FIGS. 3 and 4, have been completed, the processed cellulose-containing material, such as straw (not shown), may be removed from the processing chamber 6, and a new cycle started as described with reference to FIG. 1.

The function of the filter or sieve 11 is—especially in the operating mode shown in FIG. 3—to prevent solid matter, such as short pieces of straw, from entering the various components of the system and compromising their correct functioning. This applies especially to the nozzles or jet openings 21 in the scrubber 8, and to a lesser extent to the operation control valve 12, the liquid pump 18, and the various valves associated with the concentrate tanks 14 and 15 and the water supply. Placing the level control valve 3 between the filter or sieve 11 and the valve port 12b would also protect the level control valve itself from such solid matter; its location as shown on the other side of the filter is purely for ease of understanding of the main principles of the invention.

Figure 5:
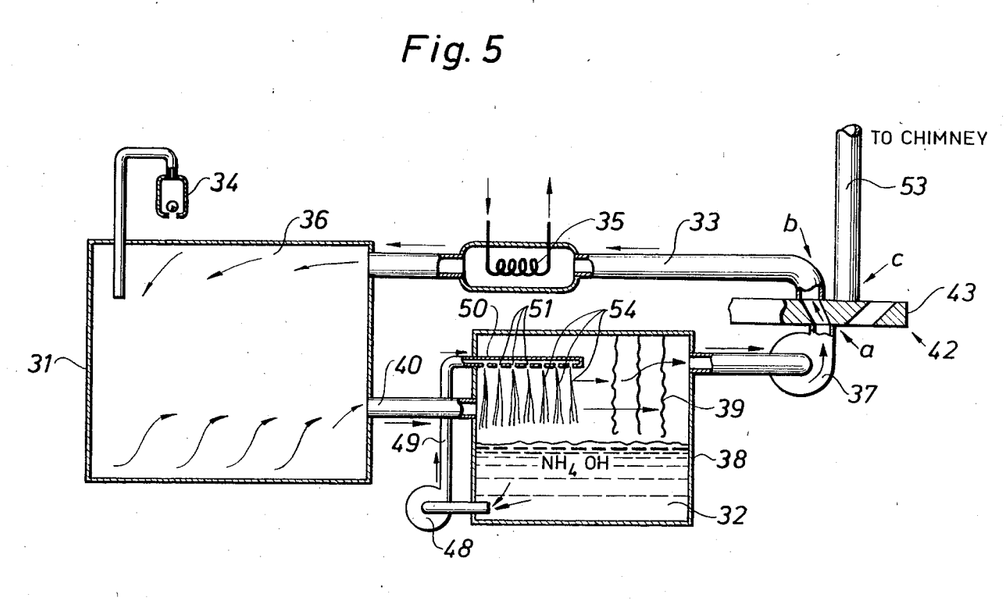
FIGS. 5 and 6 show the second embodiment in two different operating modes.
Figure 6:
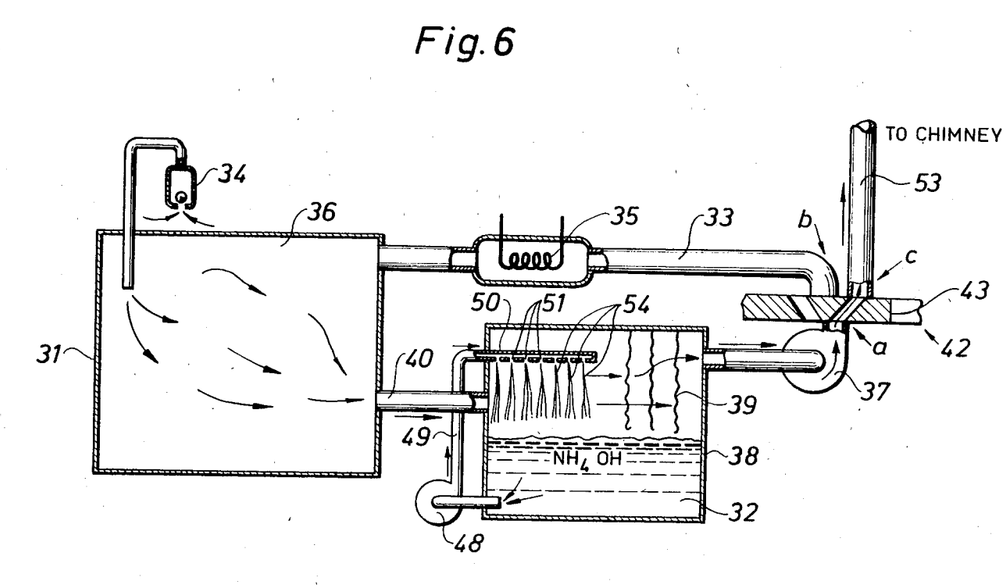

In FIGS. 5 and 6, which show an alternative embodiment of the invention, each of two operating modes are illustrated; the first mode, shown in FIG. 5, comprises the application of heat to liberate ammonia for the processing of the cellulose-containing material, such as straw, whereas the second mode, shown in FIG. 6, comprises the removal of surplus ammonia from said material and the recovering of the surplus ammonia for future use.

The components shown in FIGS. 5 and 6 are as follows:

a processing tank 31 with an air inlet valve 34 and a processing chamber, a gas exit duct 40 connecting the processing chamber 36 to a gas/liquid contact apparatus 38 containing a liquid spreader 50 with nozzles or jet openings 54 and a number of moisture-removing baffles 39, said apparatus 38 being adapted to contain a quantity of liquid 32, a liquid pump 48 adapted to pump liquid from the lower part of the gas/liquid contact apparatus 38 through a liquid pressure pipe 49 to said liquid spreader 50, a blower 37 adapted to transport gas from the upper part of the gas/liquid contact apparatus 38 through a three-way operation control valve 42 with ports a, b and c (hereinafter designated as 42a, 42b and 42c) and a valve switching slide 43, a gas return duct 33 with a heater 35 placed therein, and an exhaust pipe 53 connecting the valve 42 to, say, a chimney.

In the operating mode shown in FIG. 5, the valve switching slide 43 is set to the position shown, connecting the port 42a to the port 42b, thereby connecting the pressure side of the blower 37 to the gas return duct 33 with the heater 35, which in this mode is arranged to heat the gas passing through the duct 33, as indicated by the arrows, either by being supplied with electric power or by having some suitable heating medium passed through it.

During both the operating modes shown in FIG. 5 and FIG. 6 respectively, the material to be processed, such as straw (not shown), is present in the processing chamber 36. The process step that comprises the removal of processed material from and the placing of new material to be processed in the processing chamber 36, is not shown in the drawings.

With the valve 42 set as shown in FIG. 5, the gas—or rather a mixture of air, ammonia and water vapour—will circulate in a closed circuit as shown by the arrows. This means that the heat supplied by the heater 35 to the gas flowing through the return duct 33 will raise its temperature sufficiently for the gas to heat spray or jets 54 of liquid containing ammonium hydroxide issuing from the nozzles or jet openings 51 so as to liberate gaseous ammonia therefrom. This gaseous ammonia will flow through the baffles 39, which remove any drops of liquid remaining from the spray 54, and through the blower 37, transporting the gas through the valve 42 (ports 42a and 42b) and back through the return duct 33, where it receives additional heat to compensate for heat lost on the way from the heater 35 during the previous round.

It will be appreciated that in this operating mode, the system functions to liberate gaseous ammonia from the liquid 32 in the lower part of the gas/liquid contact apparatus 38 and to treat the material (not shown) in the processing chamber 36 with the ammonia so liberated. Ammonia used in the process or lost through leakages can be made up, either by supplying pure liquefied or gaseous ammonia to a suitable point in the system, such as the upper part of the processing chamber 36 or the gas return duct 33, or by adding an aqueous solution to the solution already present in the lower part of the gas/liquid contact apparatus 38 in the form of the liquid 32.

It will be appreciated that in the operating mode shown in FIG. 5, the gas/liquid contact apparatus 38 plays the role of an "ammonia liberator", due to heat—from the heater 35—being supplied to the ammonia-containing liquid in the form of a spray 54 in the apparatus 38.

Contrary to the situation illustrated in FIG. 5, FIG. 6 illustrates an operating mode, in which the gas/liquid contact apparatus 38 plays the same role of a "scrubber" as the component 8 shown in FIGS. 1–4. In the operating mode shown in FIG. 6, both the liquid pump 48 and the blower 37 operate as in the mode shown in FIG. 5, but due to the altered setting of the operation control valve 42, now connecting the output side of the blower 37 to the exhaust pipe 53 (through valve ports 42a and 42c), the gas from the processing chamber 36 is now passed out to the atmosphere. As the heater 35 is no longer active to heat the gas, the relatively cool liquid spray 54 will dissolve the ammonia present in the gas mixture from the processing chamber so that air with but a small content of ammonia or none at all will issue through the exhaust pipe 53.

As there is no longer any return of gas mixture through the return duct 33, due to the valve port 42b being closed or blocked, the action of the blower 37 will develop a sub-atmospheric pressure in the processing chamber 36, which pressure will cause the air inlet valve 34 to open and admit air from the atmosphere, which air will pass through the cellulose-containing material (not shown) and contribute to the removal of surplus ammonia from the material, in a similar fashion to the mode of operation shown in FIG. 3 or FIG. 4 referred to above.

In the above examples, the ammonia, containing liquid has been referred to as a solution of ammonium hydroxide ($NH_4OH$). It is, however, also within the scope of the invention to use other solutions or even solid substances capable of absorbing ammonia and again giving off same, such as by heating, provided that the process is reversible so as to make it possible to use essentially the same substance containing greater or lesser amounts of ammonia physically or chemically bonded for producing and recovering ammonia respectively.

The method and the aporatus according to the invention are not limited to what is shown in the drawings and explained in the above description, as the scope of the invention is defined by the following claims.

I claim:

1. Apparatus for treating cellulose-containing matter, such as straw, by passing gaseous ammonia through it, said apparatus comprising:
 a processing chamber for receiving material to be processed by passing gaseous ammonia therethrough;
 a compartment for containing a substance capable of giving off gaseous ammonia when heated;
 heating means for heating a substance capable of giving off gaseous ammonia;
 gas/liquid contact means for intimately contacting the gaseous media transported from the processing chamber with an ammonia absorbing substance prior to exhausting said gaseous media; and
 blower means communicating with said processing chamber for transporting gaseous media therein to said gas/liquid contact means and exhausting same.

2. Apparatus for treating cellulose-containing matter, such as straw, by passing ammonia through it, comprising:
 a processing chamber for receiving material to be processed by passing ammonia therethrough;
 a compartment for containing a substance capable of giving off ammonia when heated;
 heating means for heating the substance capable of releasing ammonia;
 gas/liquid contact means for intimately contacting said gaseous media from said processing chamber with a substance capable of absorbing ammonia before exhausting said gaseous media;
 blower means for transporting gaseous media from said processing chamber to said gas/liquid contact means and exhausting the treated gaseous media; and
 means cooperating with said blower means to render said heating means inactive when said blower means is transporting said gaseous media from said processing chamber and exhausting the same.

3. An apparatus according to claim 1 wherein said processing chamber and said compartment are located in a common processing tank, said compartment being located in a lower part of said tank directly below and in communication with said processing chamber, said heating means being located within said compartment to directly heat the substance that is capable of generating ammonia, and wherein said gas/liquid contact means is a scrubber which is adapted to receive a liqid form of said ammonia absorbing substance from either said compartment or an external supply.

4. An apparatus according to claim 1 wherein said processing chamber and said compartment are separate and distinct vessels spaced apart from one another and wherein said compartment includes liquid pump and spray means for pumping a liquid in said compartment through said spray means to contact the gaseous media being transported from said processing chamber.

5. An apparatus according to claim 4 wherein means are provided for operating said apparatus in a first mode whereby the gaseous media are circulated in a closed circuit and heated by said heating means or a second mode whereby the gaseous media after being contacted with the liquid from said spray means are exhausted to the atmosphere.

6. An apparatus according to claim 1 wherein valve means are provided to switch said apparatus between a first operating mode wherein the gaseous media is recirculated through said apparatus and a second operating mode wherein said gaseous media is exhausted after passing through said gas/liquid contact means.

* * * * *